(12) United States Patent
Kariya et al.

(10) Patent No.: US 8,938,992 B2
(45) Date of Patent: Jan. 27, 2015

(54) METHOD OF MANUFACTURING GLASS SHEET

(75) Inventors: Hiroyuki Kariya, Yokkaichi (JP); Takayuki Shimizu, Suzuka (JP); Mikio Kimori, Yokkaichi (JP)

(73) Assignee: AvanStrate Inc., Mie (JP)

( * ) Notice: Subject to any disclaimer, the term of this patent is extended or adjusted under 35 U.S.C. 154(b) by 66 days.

(21) Appl. No.: 13/620,152

(22) Filed: Sep. 14, 2012

(65) Prior Publication Data

US 2013/0008208 A1     Jan. 10, 2013

Related U.S. Application Data

(63) Continuation of application No. PCT/JP2011/072480, filed on Sep. 29, 2011.

(30) Foreign Application Priority Data

Sep. 30, 2010    (JP) .................................. 2010-223085

(51) Int. Cl.
*C03B 17/06*    (2006.01)

(52) U.S. Cl.
CPC ............. *C03B 17/064* (2013.01); *C03B 17/067* (2013.01)
USPC ........................ 65/90; 65/53; 65/195; 65/205

(58) Field of Classification Search
CPC ........................... C03B 17/064; C03B 17/067
USPC ........ 65/90, 53, 195, 205, 355, 356, 103, 288
See application file for complete search history.

(56) References Cited

U.S. PATENT DOCUMENTS

| | | | | | |
|---|---|---|---|---|---|
| 1,480,625 | A | * | 1/1924 | Miller ............................. | 65/194 |
| 1,609,266 | A | * | 11/1926 | Metzgar ............................ | 65/26 |
| 1,631,138 | A | * | 6/1927 | Koupal et al. ................... | 65/199 |
| 1,741,523 | A | * | 12/1929 | Krasnikov ........................ | 65/83 |
| 1,829,640 | A | * | 10/1931 | Ferngren .......................... | 65/53 |
| 1,829,641 | A | * | 10/1931 | Ferngren ......................... | 65/195 |
| 2,631,410 | A | * | 3/1953 | Drake ............................. | 65/205 |

(Continued)

FOREIGN PATENT DOCUMENTS

EP    2253598 A1 * 11/2010
JP    02-225326 A    9/1990

(Continued)

OTHER PUBLICATIONS

U.S. Appl. No. 61/180,216, filed May 21, 2009.*

(Continued)

*Primary Examiner* — Jason L Lazorcik
(74) *Attorney, Agent, or Firm* — Sughrue Mion, PLLC (57) ABSTRACT

A method of manufacturing a glass sheet according to the present invention comprises the steps of creating split flows of molten glass in a forming body 10 and causing the molten glass to flow down, subsequently merging the flows at a merging point to form a glass sheet G and causing the glass sheet to flow downward in the vertical direction. In this method of manufacturing a glass sheet, a partition member 20 is disposed facing the glass sheet G in the vicinity of a location below the forming body 10, and a facing surface of the partition member 20 is shaped so as to correspond to a sheet thickness variation of the glass sheet G, so that a gap between the glass sheet G and the partition member 20 is substantially uniform.

12 Claims, 8 Drawing Sheets

(56) References Cited

U.S. PATENT DOCUMENTS

| | | | |
|---|---|---|---|
| 2,691,247 A * | 10/1954 | Henry et al. | 65/85 |
| 2,725,679 A * | 12/1955 | Long | 65/348 |
| 3,351,448 A * | 11/1967 | Broman et al. | 65/91 |
| 3,723,082 A * | 3/1973 | Knowles et al. | 65/84 |
| 4,830,652 A * | 5/1989 | Guenthner | 65/203 |
| 4,906,270 A * | 3/1990 | Guenthner | 65/90 |
| 6,889,526 B2 * | 5/2005 | Pitbladdo | 65/53 |
| 6,990,834 B2 * | 1/2006 | Pitbladdo | 65/29.21 |
| 7,681,414 B2 * | 3/2010 | Pitbladdo | 65/193 |
| 7,895,861 B2 * | 3/2011 | Chalk et al. | 65/97 |
| 8,006,517 B2 * | 8/2011 | Pitbladdo | 65/99.1 |
| 8,037,716 B2 * | 10/2011 | Aniolek et al. | 65/95 |
| 8,056,365 B2 * | 11/2011 | Pitbladdo | 65/90 |
| 8,176,753 B2 * | 5/2012 | Kahlout et al. | 65/90 |
| 8,354,616 B2 * | 1/2013 | Nishimoto | 219/201 |
| 8,365,556 B2 * | 2/2013 | Pitbladdo | 65/195 |
| 8,453,478 B2 * | 6/2013 | Tsuda et al. | 65/90 |
| 2003/0121287 A1 * | 7/2003 | Chalk et al. | 65/90 |
| 2007/0068197 A1 * | 3/2007 | Pitbladdo | 65/90 |
| 2009/0242537 A1 * | 10/2009 | Nishimoto | 219/201 |
| 2010/0031702 A1 | 2/2010 | Tomamoto et al. | |
| 2010/0281920 A1 | 11/2010 | Nishiura et al. | |
| 2013/0067958 A1 * | 3/2013 | Kariya et al. | 65/53 |
| 2013/0133370 A1 * | 5/2013 | Boratav et al. | 65/84 |

FOREIGN PATENT DOCUMENTS

| | | |
|---|---|---|
| JP | 5-124826 A | 5/1993 |
| JP | 05-124827 A | 5/1993 |
| JP | 10-53426 A | 2/1998 |
| TW | 200837025 A | 9/2008 |
| TW | 2008327025 A | 9/2008 |
| TW | 200934735 A | 8/2009 |

OTHER PUBLICATIONS

English Translation of the International Preliminary Report on Patentability and Written Opinion of the International Searching Authority mailed Apr. 18, 2013 for corresponding International Application No. PCT/JP2011/072480.

* cited by examiner

METHOD OF MANUFACTURING GLASS SHEET

This is a Continuation of Application No. PCT/JP2011/072480 filed Sep. 29, 2011, which claims benefit to Japanese Patent Application No. 2010-223085 filed Sep. 30, 2010. This application also claims benefit to Japanese Patent Application No. 2011-542396 filed Sep. 29, 2011. All of the above-noted applications are incorporated herein by reference in their entirety.

TECHNICAL FIELD

The present invention relates to a method of manufacturing a glass sheet.

BACKGROUND ART

A downdraw method has conventionally been used as one method of manufacturing a glass sheet. In the downdraw method, split flows of molten glass which overflows from a forming body is created so that the molten glass flows down along the surface of the forming body. The two streams of molten glass are then merged at the lower end of the forming body to form a glass sheet. The glass sheet thus formed is annealed while being conveyed downward. In the annealing process, the glass sheet transitions from a viscous stage to an elastic stage via a viscoelastic stage.

SUMMARY OF INVENTION

Technical Problem

In an apparatus for manufacturing a glass sheet by the downdraw method, a heat-insulating partition plate is usually used to partition a forming body accommodating part, which is a space in which the forming body is disposed and the glass sheet is formed, and an upstream side of a forming zone, which is a space immediately below the forming body in which the formed glass sheet is cooled from the viscous stage to the viscoelastic stage in a state of having a predetermined temperature distribution in the width direction. The partition plate suppresses the movement of heat from the forming body accommodating part to the forming zone, and is put in place to provide the necessary temperature difference between the forming body accommodating part and the forming zone. A partition plate having high heat-insulating ability enables the high-temperature atmosphere of the forming body accommodating part to be efficiently maintained. The molten glass can therefore be kept at a low viscosity at which the molten glass spreads over and "wets" the surface of the forming body, and the width of the molten glass flow on the surface of the forming body can be prevented from decreasing. In the forming zone subsequent to separation of the glass from the forming body, since both end portions of the glass sheet in the width direction thereof are efficiently cooled by a low-temperature atmosphere and a cooling roll, the glass sheet still in the viscous stage is kept from shrinking in the width direction due to surface tension. The partition plate is thus highly important for suppressing shrinkage of the glass sheet in the width direction.

The thickness of the glass sheet formed in the forming body accommodating part is usually greater at both width-direction end portions than at the width-direction center portion. Therefore, in a case in which a glass sheet is held between a pair of partition plates formed by a single sheet, as disclosed in Patent Document 1 (U.S. Patent Application Publication No. 2003/121287), the size of the gap between the pair of partition plates must be set at least so that the end portions in the width direction of the glass sheet, which are the thickest parts thereof, do not touch the partition plates. However, heat exchange through the gap between the forming body accommodating part and the forming zone increases the larger the gap is, and the problem emerges that it becomes difficult to maintain an adequate temperature difference between the forming body accommodating part and the forming zone.

Techniques have been used in the past for managing heat by providing a partition plate between the forming body accommodating part and the forming zone.

For glass substrates used in liquid crystal display devices, required specs (quality) relating to glass sheet thickness deviation, warping, distortion, and the like have become stricter in recent years.

In the case of manufacturing glass sheets by the a downdraw method, in order to reduce thickness deviation, warping, and distortion of the glass, a temperature profile is designed in advance for the atmosphere in the flow direction and width direction, and heat is managed for the atmosphere so as to fit the designed temperature profile.

The precision of the designed temperature profile must be increased in order to satisfy the recent stricter spec requirements, and there is therefore a need to increase the precision of heat management.

An object of the present invention is to provide an improved apparatus for manufacturing a glass sheet, in which the precision of heat management can be increased in the manufacture of a glass sheet by a downdraw method, and to provide a method of manufacturing a glass sheet in which the precision of heat management is increased.

An object of the present invention is more specifically to provide a glass sheet manufacturing method in which the precision of heat management is increased to suppress shrinkage of the glass sheet in the width direction and enable glass sheets of uniform thickness to be obtained at a high yield; to provide a glass sheet manufactured using the glass sheet manufacturing method; and to provide an apparatus for manufacturing a glass sheet, capable of suppressing the width shrinkage of a glass sheet and producing glass sheets of uniform thickness at a high yield.

Solution to Problem

A method of manufacturing a glass sheet according to the present invention is a method of manufacturing a glass sheet, the method comprising the steps of creating split flows of molten glass in a forming body and causing the molten glass to flow down, subsequently merging the flows at a merging point to form a glass sheet and causing the glass sheet to flow downward in the vertical direction. In this method of manufacturing a glass sheet, a heat-insulating member is disposed facing the glass sheet in the vicinity of a location below the forming body, and a facing surface of the heat-insulating member is shaped so as to correspond to a sheet thickness variation of the glass sheet, so that a gap between the glass sheet and the heat-insulating member is substantially uniform.

In a method of manufacturing a glass sheet by a downdraw method, an adequate temperature difference is preferably set up between the forming body accommodating part, in which molten glass flows down the surface of a forming body to merge at a merging point and form a glass sheet, and the forming zone, which is a space in which the formed glass sheet is cooled to the required viscosity. A heat-insulating member having heat insulating properties is usually provided in order to keep heat from moving to the forming zone from the forming body accommodating part, which has a high-temperature atmosphere. Since the high-temperature atmosphere of the forming body accommodating part is thereby efficiently maintained, the molten glass flowing on the surface of the forming body attains a low-viscosity state, and the molten glass is made to spread over and "wet" the surface of the forming body. As a result, the flow of molten glass on the surface of the forming body can be kept from shrinking in the width direction thereof. The glass sheet separated from the forming body can also be kept from shrinking in the width direction due to surface tension.

In the method of manufacturing a glass sheet according to the present invention, the heat-insulating member is disposed facing the glass sheet in the vicinity of a location below the forming body. The facing surface of the heat-insulating member is shaped so as to correspond to a sheet thickness variation of the glass sheet, so that a gap between the glass sheet and the heat-insulating member is substantially uniform. Since the open area of the gap between the glass sheet and the heat-insulating member is reduced by this heat-insulating member, movement of heat from the forming body accommodating part to the forming zone can be suppressed as much as possible. Consequently, in the method of manufacturing a glass sheet according to the present invention, width shrinkage of the glass sheet can be suppressed, and glass sheets of uniform thickness can be obtained at a high yield.

Preferably, the facing surface of the heat-insulating member is shaped so as to correspond to the sheet thickness variation of the glass sheet, so that the gap between the glass sheet and the heat-insulating member decreases. Since the open area of the gap between the glass sheet and the heat-insulating member is further effectively reduced by this heat-insulating member, movement of heat from the forming body accommodating part to the forming zone can be more effectively suppressed.

Preferably, the sheet thickness of the glass sheet is greater at both end portions thereof than at a center portion thereof.

Preferably, the heat-insulating member has members which are independent of each other and correspond to a center portion and both end portions of the glass sheet.

Preferably, the members separate from and come close to the glass sheet.

Preferably, the heat-insulating member is disposed between the forming body and a cooling roll for cooling an end portion of the glass sheet and suppressing shrinkage thereof in the width direction.

Preferably, a cooling roll or an end portion cooling device for cooling an end portion of the glass sheet and suppressing shrinkage thereof in the width direction, is disposed below the heat-insulating member.

Advantageous Effects of Invention

The present invention can provide an improved apparatus for manufacturing a glass sheet, in which the precision of heat management can be increased in the manufacture of a glass sheet by a downdraw method, and can provide a method of manufacturing a glass sheet in which the precision of heat management is increased.

More specifically, the present invention can provide a glass sheet manufacturing method capable of suppressing the width shrinkage of a glass sheet and producing glass sheets of uniform thickness at a high yield; a glass sheet manufactured using the glass sheet manufacturing method; and an apparatus for manufacturing a glass sheet, capable of suppressing the width shrinkage of a glass sheet and producing glass sheets of uniform thickness at a high yield.

DESCRIPTION OF EMBODIMENTS (1) Overall Configuration

Figure 1:
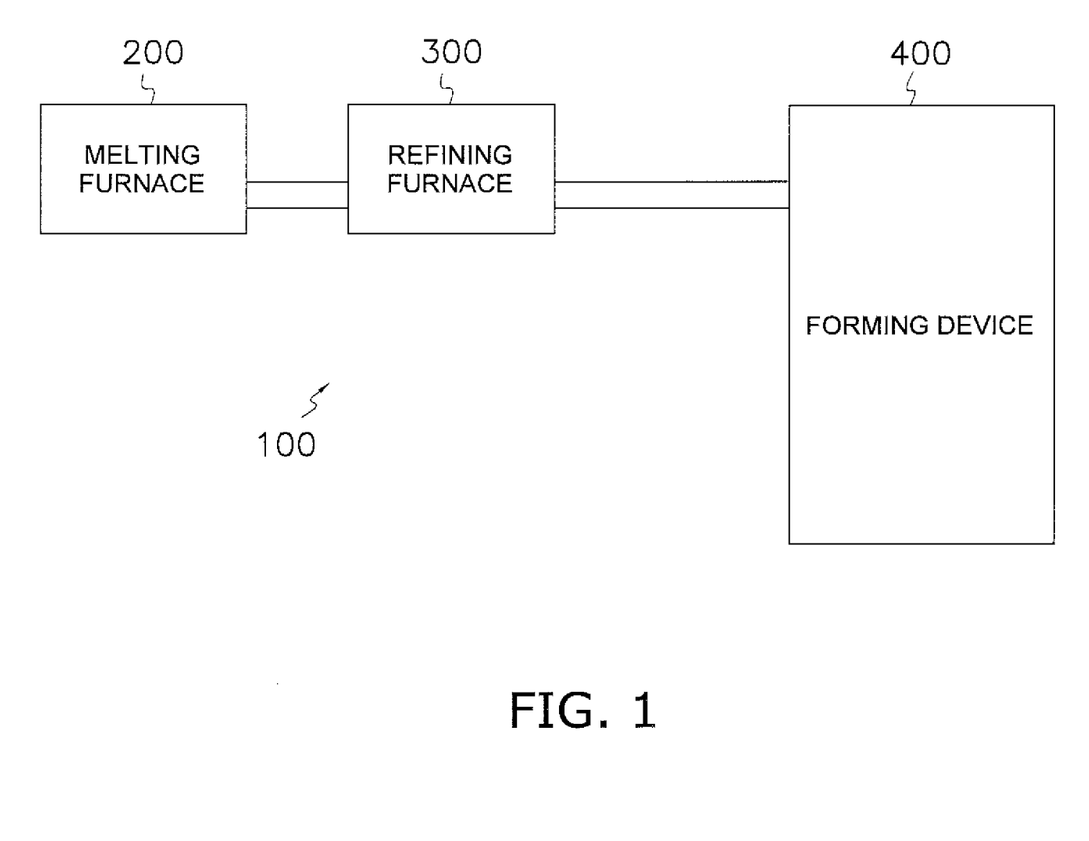
FIG. 1 is a view summarizing the configuration of the glass sheet manufacturing apparatus.

The general configuration of the glass sheet manufacturing apparatus 100 according to an embodiment of the present invention will first be described. As shown in FIG. 1, the glass sheet manufacturing apparatus 100 is composed of a melting furnace 200, a refining furnace 300, and a forming device 400. In the melting furnace 200, raw materials for glass are melted to create molten glass. The molten glass created in the melting furnace 200 is sent to the refining furnace 300. Air bubbles in the molten glass are removed in the refining furnace 300. The molten glass from which air bubbles have been removed in the refining furnace 300 is sent to the forming device 400. In the forming device 400, a glass sheet G is continuously formed from the molten glass by an overflow downdraw method. The glass sheet G thus formed is then annealed and cut into glass sheets of a predetermined size. The glass sheets are used as glass substrates for liquid crystal displays and/or plasma displays and other flat-panel displays.

The detailed configuration of the forming device 400 will next be described.

(2) Detailed Configuration of the Forming Device

Figure 2:
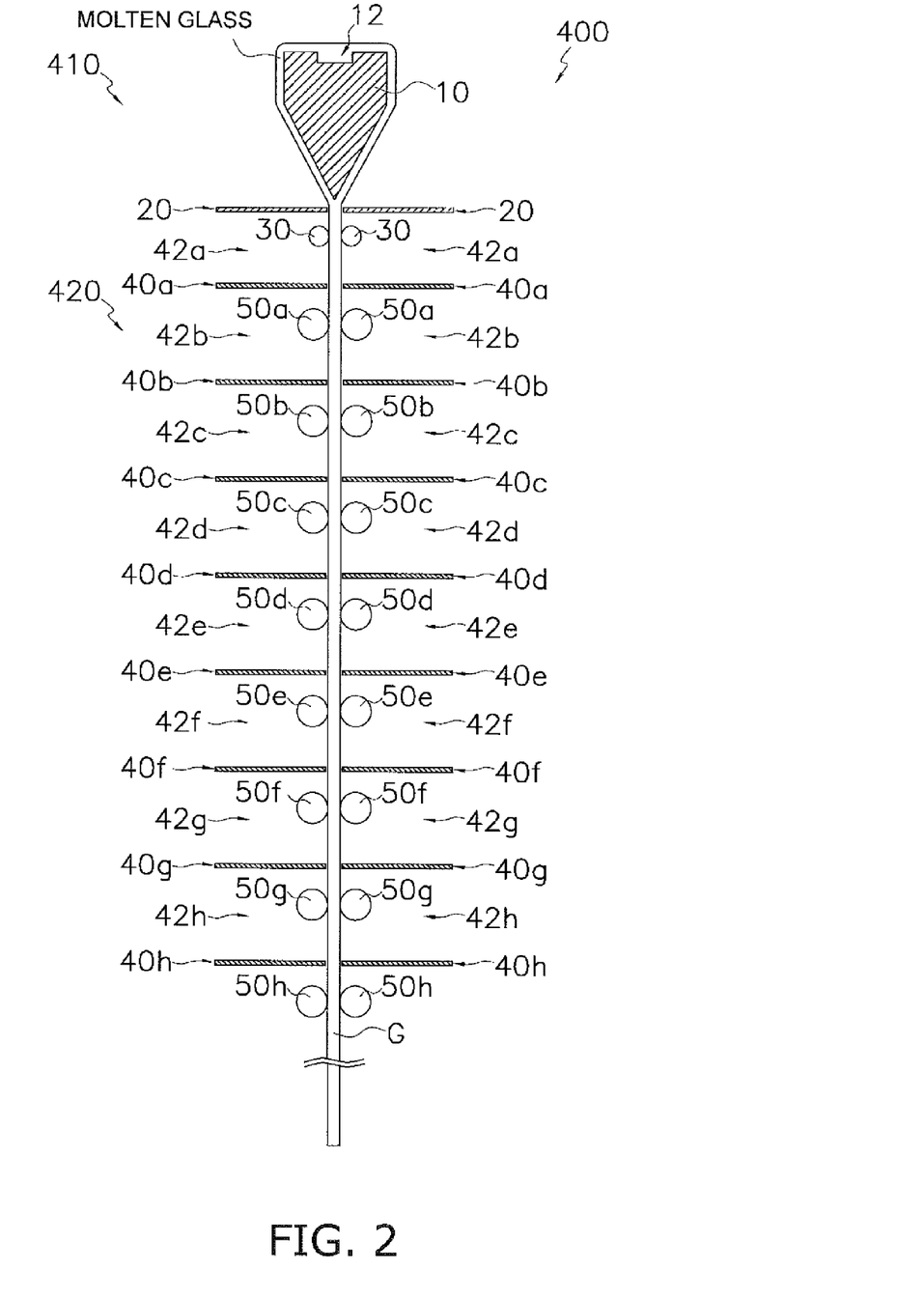
FIG. 2 is a schematic sectional view showing the forming device.
Figure 3:
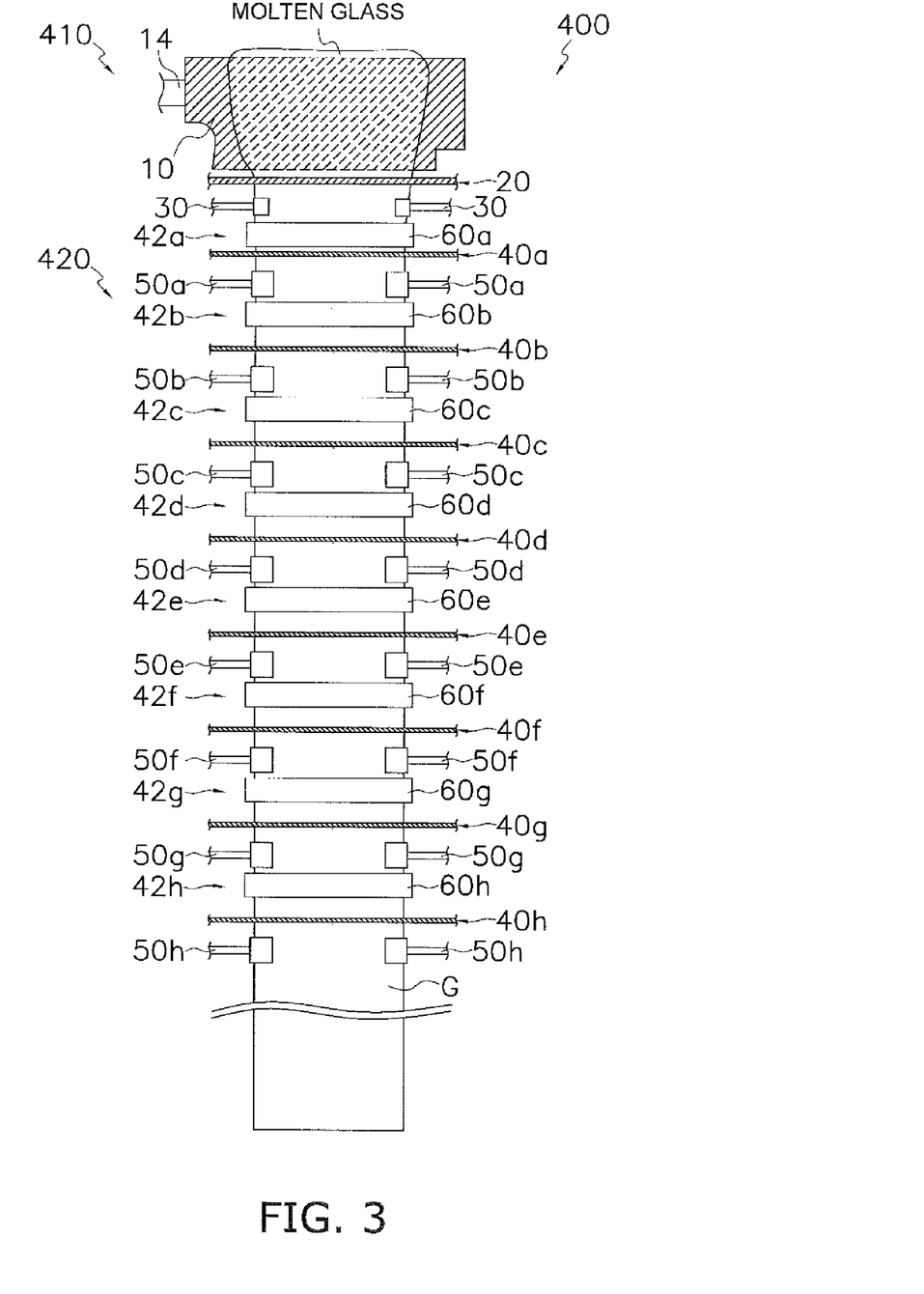
FIG. 3 is a schematic side view showing the forming device.

The forming device 400 is composed of a forming body 10, partition members 20, cooling rollers 30, heat-insulating plates 40a, 40b, and so on, feed rollers 50a, 50b, and so on, and temperature control units 60a, 60b, and so on. As shown in FIGS. 2 and 3, the forming device 400 has a forming body accommodating part 410 which is a space above the partition members 20; a forming zone 42a which is a space immediately below the partition members 20; and an annealing zone 420 which is a space below the forming zone 42a. The annealing zone 420 has a plurality of annealing spaces 42b, 42c, and so on. The forming zone 42a, annealing space 42b, annealing space 42c, annealing space 42d, and so on are stacked in this order top-downward in the vertical direction.

(2-1) Forming Body

As shown in FIG. 2, the forming body 10 is a member having a substantially wedge-shaped cross-section. The forming body 10 is disposed in the forming body accommodating part 410 so that the point of the wedge shape is at the lower end thereof. As shown in FIG. 3, a groove 12 is formed in an upper end surface of the forming body 10. The groove 12 is formed in the longitudinal direction of the forming body 10. A glass supply tube 14 is provided at one end of the groove 12.

The groove 12 is formed so as to gradually decrease in depth from the one end thereof, at which the glass supply tube 14 is provided, to the other end.

(2-2) Partition Members

The partition members 20 are plate-shaped heat-insulating members disposed in the vicinity of the lower end of the forming body 10. The partition members 20 are disposed so that the height position of the lower ends thereof is in the range from the height position of the lower end of the forming body 10 to a height position 50 mm below the lower end of the forming body 10. As shown in FIG. 2, the partition members 20 are disposed on both sides in the thickness direction of the glass sheet G. The partition members 20 suppress the movement of heat from the forming body accommodating part 410 to the forming zone 42a by acting as a partition between the forming body accommodating part 410 and the forming zone 42a.

Figure 4:
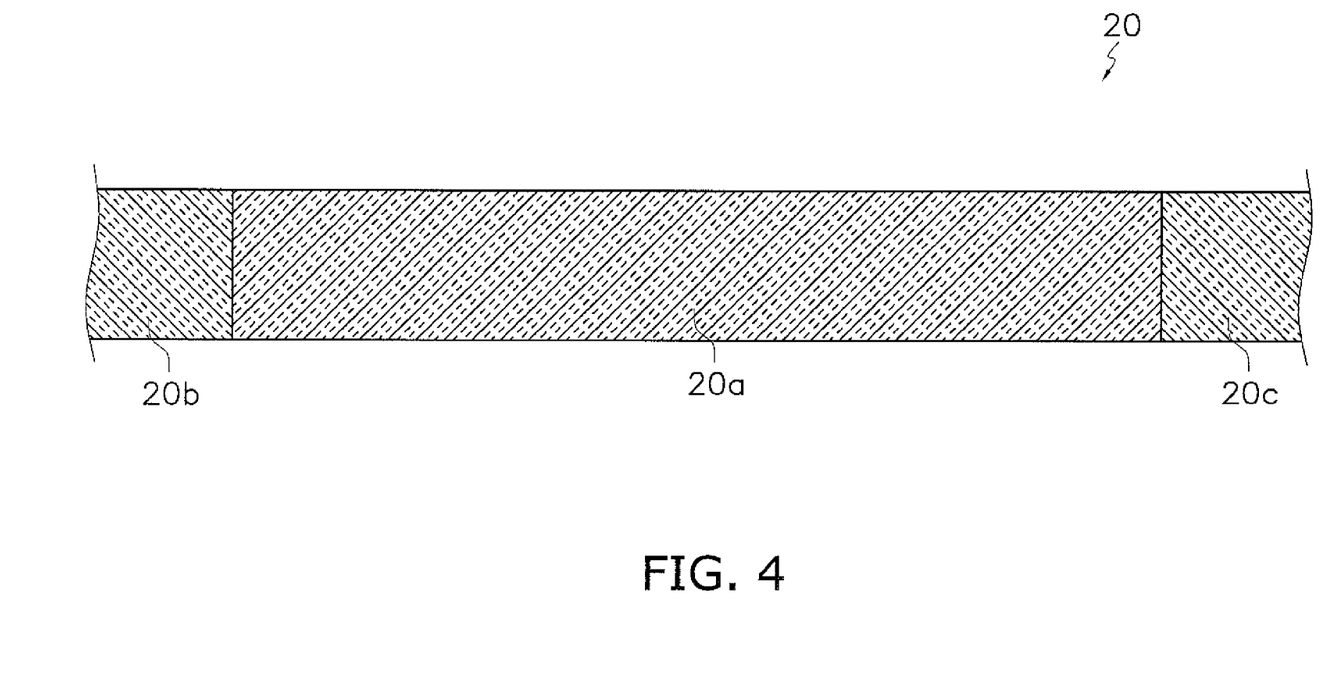
FIG. 4 is a schematic top view showing the partition member.
Figure 5:
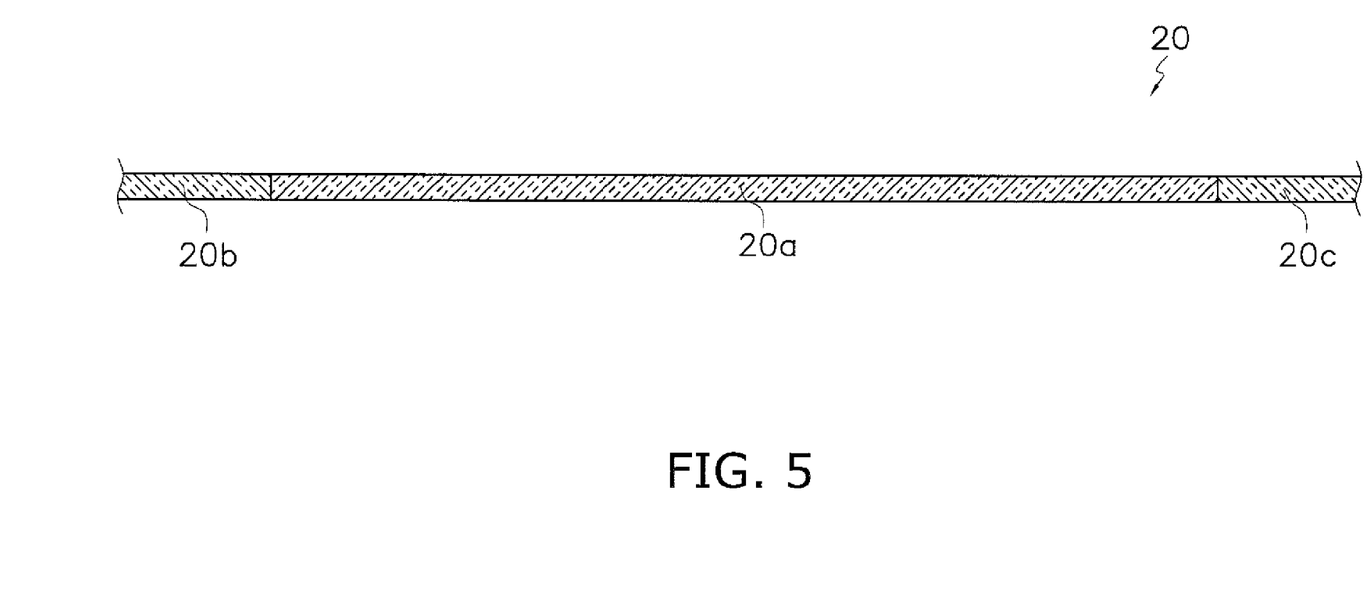
FIG. 5 is a schematic side view showing the partition member.

The partition members 20 are composed of one first partition plate 20a and two second partition plates 20b, 20c. The first partition plate 20a and the second partition plates 20b, 20c are formed of ceramic fibers. The second partition plates 20b, 20c are disposed near both ends of the first partition plate 20a in the width direction of the glass sheet G. For example, as shown in FIGS. 4 and 5, the second partition plates 20b, 20c are respectively disposed adjacent to both ends of the first partition plate 20a in the width direction of the glass sheet G. The first partition plate 20a is secured by a beam or the like to a casing (not shown in the drawing) of the forming device 400. The second partition plates 20b, 20c are provided so as to be able to move in the thickness direction of the glass sheet G. The distance between the second partition plates 20b, 20c and the glass sheet G can be adjusted by moving the second partition plates 20b, 20c. In the present embodiment, the position of the first partition plate 20a is fixed in advance and the positions of the second partition plates 20b, 20c are adjusted so that the gap between the glass sheet G and the partition members 20 is 10 mm to 50 mm.

The forming body accommodating part 410 and the forming zone 42a are partitioned from each other by the heat-insulating partition members 20 for the purpose of temperature control, so that the spaces of the forming body accommodating part 410 and forming zone 42a do not affect each other as to the temperature thereof. In the manufacture of glass substrates for liquid crystal displays, for example, the partitioning described above is provided in order to maintain the atmosphere of the forming body accommodating part 410 at a temperature of 1,200 to 1,300° C. or higher, and to maintain the atmosphere of the lower space at a temperature of 400 to 700° C. (e.g., 600 to 700° C.).

In the manufacture of glass substrates for liquid crystal displays, for example, the atmosphere of the upper space is maintained at a temperature of 1,200° C. to 1,300° C. or higher in order to give the molten glass a low viscosity so that the molten glass spreads over and "wets" the surface of the forming body, and to prevent the width of the molten glass flow on the surface of the forming body 10 from decreasing.

In the manufacture of glass substrates for liquid crystal displays, for example, the atmosphere of the lower space is maintained at a temperature of 400 to 700° C. (e.g., 600° C. to 700° C.) in order to rapidly lower the temperature and increase the viscosity of the molten glass immediately after the molten glass flows are merged by the forming body 10, and thereby suppress shrinkage of the molten glass in the width direction due to surface tension which acts on the molten glass.

(2-3) Cooling Rollers

The cooling rollers 30 are disposed in the vicinity of the partition members 20 in the forming zone 42a. The cooling rollers 30 are disposed on both sides of the glass sheet G in the thickness direction thereof.

(2-4) Heat-insulating Plates

The heat-insulating plates 40a, 40b, and so on are plate-shaped heat-insulating members disposed below the cooling rollers 30 on both sides of the glass sheet G in the thickness direction thereof. The positions of the heat-insulating plates 40a, 40b, and so on are adjusted in advance so that the gap between the glass sheet G and the heat-insulating plates 40a, 40b, and so on is 10 mm to 50 mm. The heat-insulating plate 40a is disposed between the forming zone 42a and the annealing space 42b. The heat-insulating plate 40a suppresses the movement of heat between the forming zone 42a and the annealing space 42b. The heat-insulating plates 40b, 40c, and so on are disposed between the adjacent two annealing spaces 42b, 42c, and so on, respectively. For example, the heat-insulating plate 40b is disposed between the annealing space 42b and the annealing space 42c, as shown in FIG. 2. The heat-insulating plate 40b suppresses the movement of heat between the annealing space 42b and the annealing space 42c.

(2-5) Feed Rollers

The feed rollers 50a, 50b, and so on are disposed in the annealing spaces 42b, 42c, and so on, respectively, on both sides of the glass sheet G in the thickness direction thereof. For example, the feed rollers 50a are disposed in the annealing space 42b, and the feed rollers 50b are disposed in the annealing space 42c.

(2-6) Temperature Control Units

The temperature control units 60a, 60b, and so on are disposed in the forming zone 42a and the annealing spaces 42b, 42c, and so on, respectively, and measure and control the atmospheric temperatures of the forming zone 42a and the annealing spaces 42b, 42c, and so on. The temperature control units 60a, 60b, and so on control the atmospheric temperatures of the forming zone 42a and the annealing spaces 42b, 42c, and so on so that the atmospheric temperature in the vicinity of the glass sheet G forms a predetermined temperature distribution (referred to hereinafter as a "temperature profile") in the width direction of the glass sheet G. The temperature control units 60a, 60b, and so on appropriately control the temperature profile of the forming zone 42a and the annealing spaces 42b, 42c, and so on, and the glass sheet G is thereby uniformly annealed in the annealing zone 420.

(3) Operation (3-1)

The process by which the glass sheet G is formed by the forming device 400 is described below.

The molten glass created in the melting furnace 200 and divested of air bubbles in the refining furnace 300 is sent to the forming body accommodating part 410 of the forming device 400. In the forming body accommodating part 410, the molten glass is fed to the groove 12 of the forming body 10 via the glass supply tube 14. Molten glass which is retained in and overflow from the groove 12 forms split flows in the transverse direction of the forming body 10 and flows down along the surfaces of both sides of the forming body 10. The downward-flowing molten glass merges at the lower end portion of the forming body 10. The merged molten glass flows downward, continuously forming a glass sheet G.

The glass sheet G formed in the forming body accommodating part 410 is sent to the forming zone 42a and the annealing zone 420.

The glass sheet G is drawn down by the feed rollers 50a, 50b, and so on of the annealing zone 420. The glass sheet G drawn down by the feed rollers 50a, 50b, and so on is held between cooled metal cooling rollers 30 only at the area of the glass sheet G near both ends thereof, the cooling rollers 30 being set so that the peripheral speed thereof is less than that of the feed rollers 50*a*, 50*b*, and so on in the forming zone 42*a* which is located on the upstream side of the feed rollers 50*a*, 50*b*, and so on, and the tendency of the sheet width to decrease due to the surface tension of the glass itself and the downward tension applied by the feed rollers 50*a*, 50*b*, and so on is thereby suppressed to some degree.

In the forming zone 42*a* and the annealing zone 420, the temperature profile of the forming zone 42*a* and the annealing spaces 42*b*, 42*c*, and so on is controlled by the temperature control units 60*a*, 60*b*, and so on. Specifically, the atmospheric temperatures of the forming zone 42*a* and the annealing spaces 42*b*, 42*c*, and so on are measured, and the atmospheric temperatures of the forming zone 42*a* and the annealing spaces 42*b*, 42*c*, and so on are controlled so that predetermined temperature profile is obtained.

Specifically, by obtaining a predetermined temperature profile in the width direction of the glass sheet G in the forming zone 42*a* and the annealing spaces 42*b*, 42*c*, and so on, the thickness of the glass sheet G can be made uniform, and warping and distortion thereof can be reduced.

Thermal shrinkage of the glass sheet G can also be reduced by obtaining a predetermined temperature profile in the flow direction of the glass sheet G in the forming zone 42*a* and the annealing spaces 42*b*, 42*c*, and so on.

(3-2)

Figure 6:
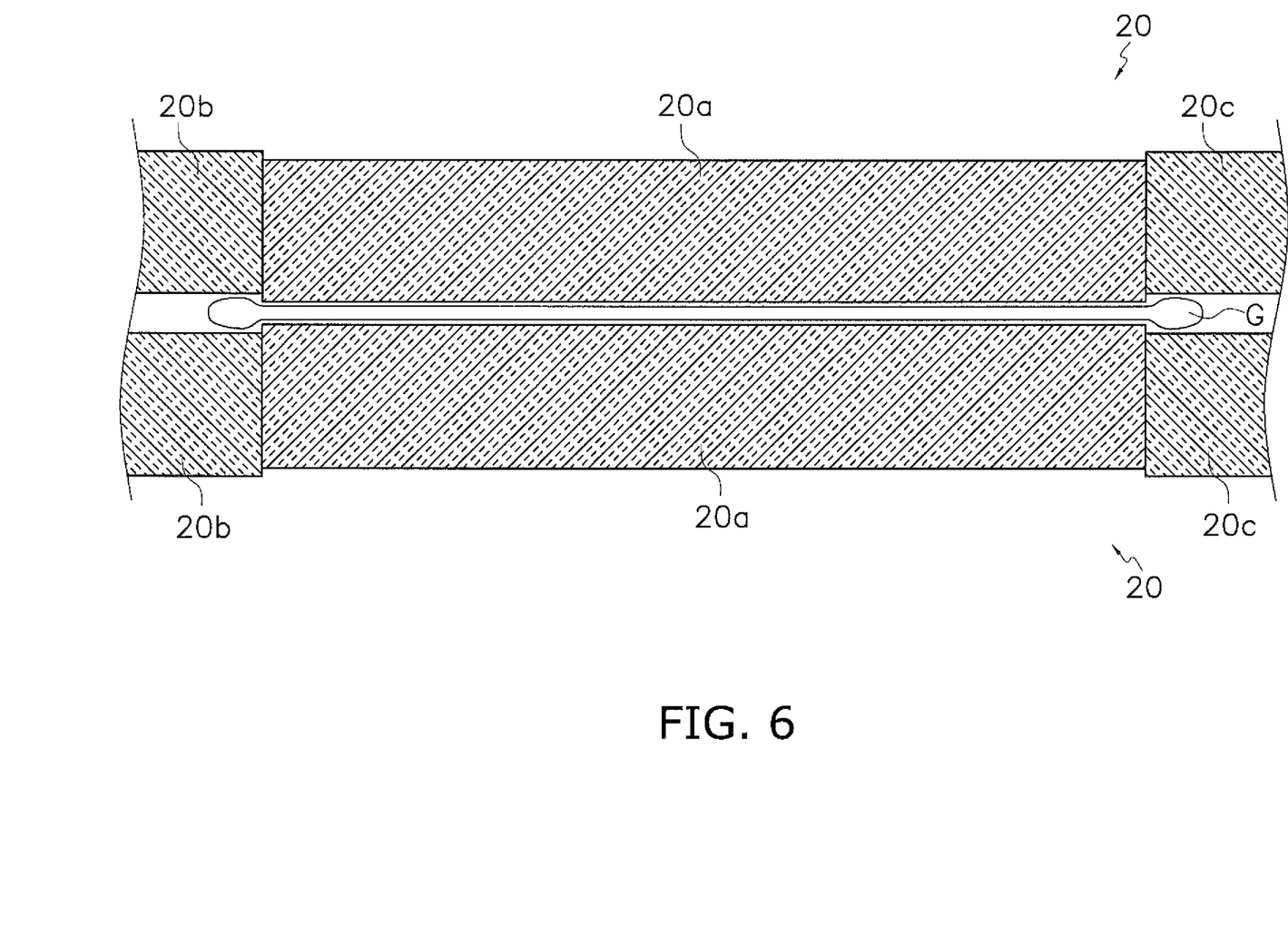
FIG. 6 is a schematic view showing the pair of partition members with the glass sheet therebetween in plan view.

The process of changing the relative positioning of the first partition plate 20*a* and the second partition plates 20*b*, 20*c* by moving the second partition plates 20*b*, 20*c* in the thickness direction of the glass sheet G will next be described. FIG. 6 is a plan view showing the pair of partition members 20, between which is held the glass sheet G formed in the forming body accommodating part 410.

It is generally preferred that the gap between the partition members 20 and the glass sheet G be as small as possible in order to suppress the movement of heat from the forming body accommodating part 410 to the forming zone 42*a*. However, the glass sheet G formed in the forming body accommodating part 410 has a cross-sectional shape in which both end parts thereof in the width direction are swollen. In the present embodiment, as shown in FIG. 6, the first partition plates 20*a* are fixed so as to be as close as possible to the glass sheet G according to the thickness of the glass sheet G, and the second partition plates 20*b*, 20*c* are moved so as to be as close as possible to the glass sheet G according to the shape of the end portions of the glass sheet G in the width direction. Specifically, the gap between the partition members 20 and the glass sheet G is made as small as possible by adjusting the positions of the second partition plates 20*b*, 20*c* according to the cross-sectional shape of the glass sheet G. At this time, the positions of the second partition plates 20*b*, 20*c* are adjusted so that the gap between the pair of first partition plates 20*a* facing the thin width-direction center portion of the glass sheet G is smaller than the gap between the pairs of second partition plates 20*b*, 20*c* facing the thick width-direction end portions of the glass sheet G. The open area of the gap between the pair of partition members 20 is thereby reduced.

(4) Features (4-1)

In the glass sheet manufacturing apparatus 100 according to the present embodiment, the partition members 20 are each composed of one first partition plate 20*a* and two second partition plates 20*b*, 20*c*. The first partition plates 20*a* are fixedly provided, and the second partition plates 20*b*, 20*c* are provided so as to be able to move.

The thickness of the glass sheet G formed in the forming body accommodating part 410 varies in the width direction of the glass sheet G. The thickness of both width-direction end portions of the glass sheet G is generally greater than the thickness of the width-direction center portion thereof. The first partition plates 20*a* are disposed so as to face the surface of the width-direction center portion of the glass sheet G. The second partition plates 20*b*, 20*c* are disposed so as to face the surface of both width-direction end portions of the glass sheet, respectively. The first partition plates 20*a* are fixed in advance in a predetermined position according to the thickness of the glass sheet G, and the second partition plates 20*b*, 20*c* are moved according to the shape of the width-direction end portions of the glass sheet G. Specifically, the positions of the second partition plates 20*b*, 20*c* in the horizontal direction are adjusted so that the respective gaps between the second partition plates 20*b*, 20*c* and the glass sheet G are as small as possible. The open area of the gaps between the pairs of partition members 20 for partitioning the forming body accommodating part 410 and the forming zone 42*a* is thereby reduced, and the movement of heat from the forming body accommodating part 410 to the forming zone 42*a* can therefore be efficiently suppressed. It is therefore possible to provide an adequate temperature difference between the forming body accommodating part 410 and the forming zone 42*a*. Specifically, the atmosphere of the forming body accommodating part 410 can be maintained at a high temperature, and the atmospheric temperature of the annealing zone 420 can be kept from being raised by the forming body accommodating part 410.

Consequently, in the glass sheet manufacturing apparatus 100 according to the present embodiment, since the high-temperature atmosphere of the forming body accommodating part 410 is efficiently maintained, the molten glass flowing on the surface of the forming body 10 attains a low-viscosity state, and the molten glass is made to spread over and "wet" the surface of the forming body 10. As a result, the flow of molten glass on the surface of the forming body 10 can be kept from shrinking in the width direction thereof. The glass sheet G separated from the forming body 10 and cooled without touching anything can also be kept from shrinking in the width direction due to surface tension. Specifically, by the glass sheet manufacturing apparatus 100 of the present embodiment, width shrinkage of the glass sheet G can be suppressed, and glass sheets G of uniform thickness can be obtained at a high yield.

(4-2)

In the glass sheet manufacturing apparatus 100 according to the present embodiment, the first partition plates 20*a* and the second partition plates 20*b*, 20*c* are formed of ceramic fibers. Ceramic fibers have high heat resistance and high heat-insulating ability, and are therefore suitable as the material of the partition members 20 for providing an adequate temperature difference between the forming body accommodating part 410 and the forming zone 42*a*.

(5) Modifications (5-1) Modification A

A glass sheet manufacturing apparatus 100 provided with a forming device 400 for forming a glass sheet G using an overflow downdraw method is described in the present embodiment, but the glass sheet manufacturing apparatus 100 may also be provided with a forming device for forming a glass sheet using a slot downdraw method.

(5-2) Modification B

Figure 7:
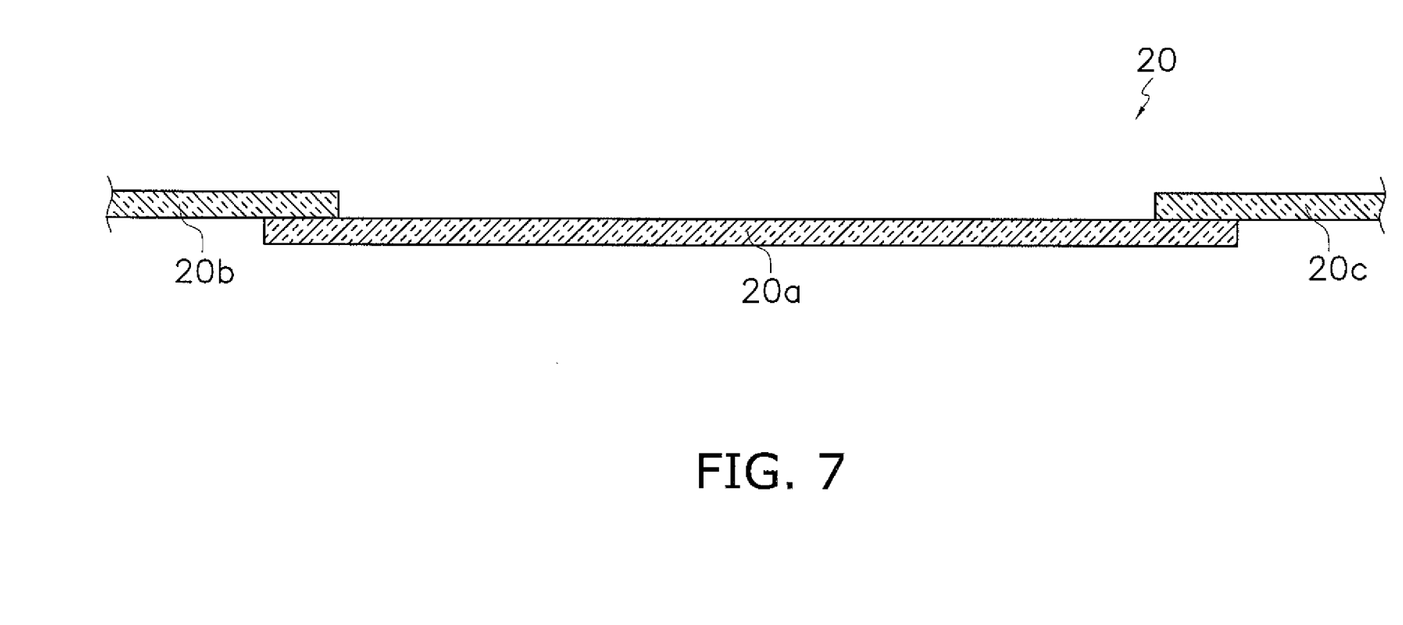
FIG. 7 is a schematic side view showing the partition member in Modification B.

In the present embodiment, the second partition plates 20*b*, 20*c* are disposed adjacent to either end of the first partition plates 20*a* in the width direction of the glass sheet G, as shown in FIG. 5. However, the second partition plates 20b, 20c may also be disposed so as to partially overlap with either end portion of the first partition plates 20a in the width direction of the glass sheet G, as shown in FIG. 7.

(5-3) Modification C

In the present embodiment, the first partition plates 20a are fixed in position and the second partition plates 20b, 20c are provided so as to be able to move in the thickness direction of the glass sheet G. However, the partition plates may be configured in any manner insofar as at least one of the first partition plates 20a and second partition plates 20b, 20c can move in the thickness direction of the glass sheet G. For example, the second partition plates 20b, 20c may be fixed, and the first partition plates 20a may be movably provided.

(5-4) Modification D

The partition members 20 are each composed of three partition plates, made up of one first partition plate 20a and two second partition plates 20b, 20c in the present embodiment, but the partition members 20 may be composed of five, seven, or more partition plates.

In the present modification, the shape of the partition members 20 can be more finely adjusted according to the cross-sectional shape of the glass sheet G. The gap between the partition members 20 and the glass sheet G can thereby be further reduced, and the movement of heat from the forming body accommodating part 410 to the forming zone 42a can be more efficiently suppressed. Shrinkage of the glass sheet G in the width direction thereof can thus be more efficiently suppressed by the present modification.

(5-5) Modification E

The partition members 20 are each composed of one first partition plate 20a and two second partition plates 20b, 20c in the present embodiment, but the heat-insulating plates 40a, 40b, and so on may also be composed of a plurality of plate-shaped members, and some of these members may be provided so as to be able to move in the thickness direction of the glass sheet G.

In the present modification, the shapes of the heat-insulating plates 40a, 40b, and so on can be changed based on the cross-sectional shape of the glass sheet G which is sent downward in the annealing spaces 42b, 42c, and so on. For example, a portion of the components constituting the heat-insulating plate 40b is moved in the thickness direction of the glass sheet G in order to make the gap between the heat-insulating plate 40b and the glass sheet G as small as possible. The movement of heat between the annealing space 42c and the annealing space 42b adjacent to the heat-insulating plate 40b can thereby be suppressed. The glass sheet G can therefore be effectively annealed in the annealing zone 420 in the present modification by performing control so that the atmospheric temperature of the annealing spaces 42b, 42c, and so on gradually decreases from top to bottom.

(5-6) Modification F

The partition members 20 are each composed of one first partition plate 20a and two second partition plates 20b, 20c in the present embodiment, but may be composed of a single partition plate which corresponds to a sheet thickness variation of the glass sheet G.

(5-7) Modification G

In the present embodiment, the partition members 20 are each composed of one first partition plate 20a and two second partition plates 20b, 20c, and the second partition plates 20b, 20c are disposed facing the surfaces of both width-direction end portions of the glass sheet G. However, as shown in FIG. 6, since the second partition plates 20b, 20c are disposed so that the width thereof exceeds that of the glass sheet G; the portion not occupied by the downflow of the glass sheet G forms a space sandwiched by the end faces of the pair of second partition plates 20b, 20c. The second partition plates may therefore further comprise two small partition plates in order to reduce the amount of space.

Figure 8:
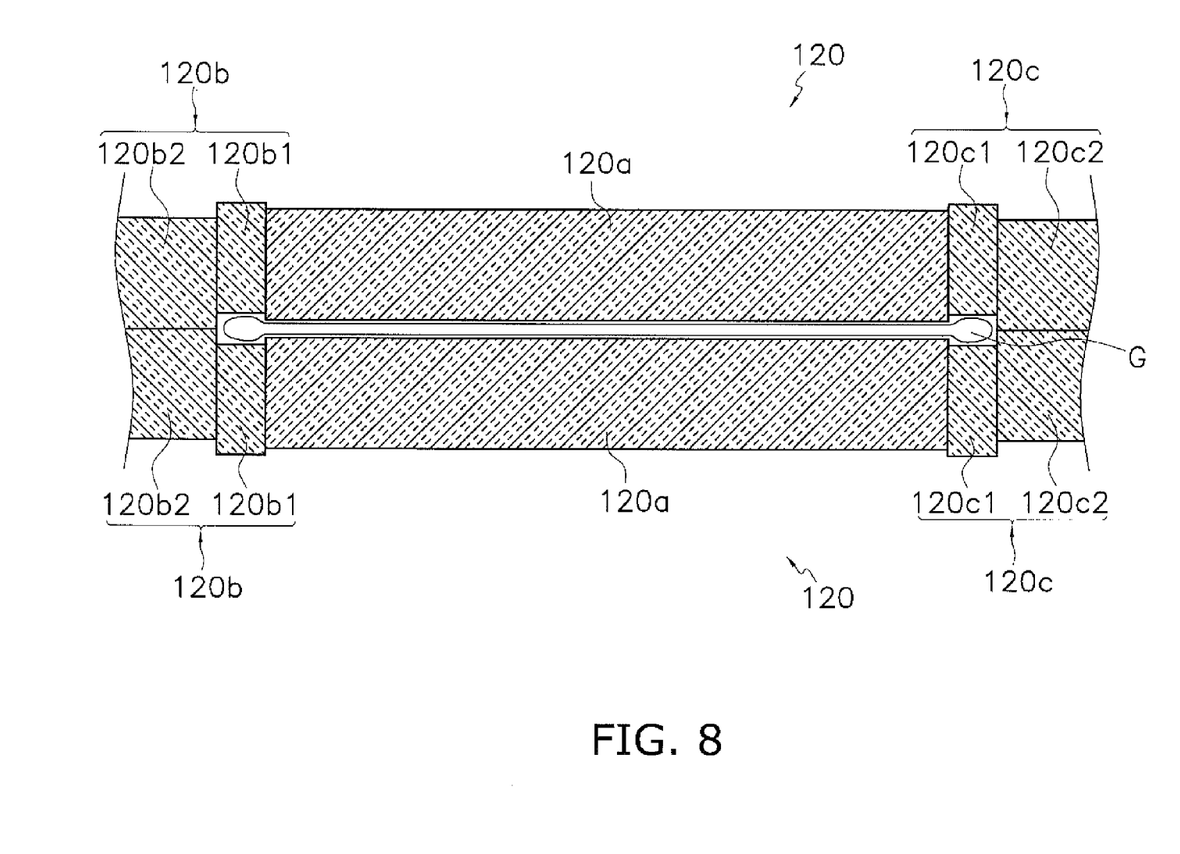
FIG. 8 is a schematic top view showing the second partition plate of the partition member in Modification G.

In the present modification, partition members 120 are each composed of one first partition plate 120a and two second partition plates 120b, 120c, the second partition plate 120b is further composed of a first small partition plate 120b1 and a second small partition plate 120b2, and the second partition plate 120c is further composed of a first small partition plate 120c1 and a second small partition plate 120c2, as shown in FIG. 8. In each second partition plate 120b, the first small partition plate 120b1 is connected to the second small partition plate 120b2 in the width direction of the glass sheet G. Each first small partition plate 120b1 is connected to a first partition plate 120a in the width direction of the glass sheet G. Specifically, each first small partition plate 120b1 is disposed between a first partition plate 120a and a second small partition plate 120b2. Likewise in each second partition plate 120c, the first small partition plate 120c1 is disposed between a first partition plate 120a and a second small partition plate 120c2, according to the same configuration as in the second partition plate 120b.

In the present modification, the first small partition plates 120b1, 120c1 of the second partition plates 120b, 120c are disposed facing the surfaces of both width-direction end portions of the glass sheet G, as shown in FIG. 8. The second small partition plates 120b2, 120c2 of the second partition plates 120b, 120c on one side are disposed facing the second small partition plates 120b2, 120c2 of the other side. The pair of second small partition plates 120b2, 120c2 are disposed so that end surfaces thereof touch each other, or so that the end surfaces thereof are extremely close to each other. The open area of the gap between the pair of partition members 120 and the glass sheet G can thereby be more effectively reduced, and the movement of heat from the forming body accommodating part 410 to the forming zone 42a can therefore be more efficiently suppressed.

INDUSTRIAL APPLICABILITY

By the method of manufacturing a glass sheet according to the present invention, width shrinkage of glass sheets can be suppressed, and glass sheets of uniform thickness can be obtained at a high yield.

REFERENCE SIGNS LIST 10 forming body
12 groove
14 glass supply tube
20 partition members (heat-insulating members)
20a first partition plate
20b second partition plate
20c second partition plate
30 cooling rollers
40a, 40b, and so on heat-insulating plates
42a forming zone
42b, 42c, and so on annealing spaces
50a, 50b, and so on feed rollers
60a, 60b, and so on temperature control units
100 glass sheet manufacturing apparatus
200 melting furnace
300 refining furnace
400 forming device
410 forming body accommodating part
420 annealing zone
G glass sheet

CITATION LIST

Patent Literature

<Patent Document 1> U.S. Patent Application Publication No. 2003/121287

The invention claimed is:

1. A method of manufacturing a glass sheet, comprising the steps of creating split flows of molten glass in a forming body and causing the molten glass to flow down, subsequently merging the flows at a merging point to form a glass sheet and causing the glass sheet to flow downward in the vertical direction; the method of manufacturing a glass sheet characterized in that:

a heat-insulating member is disposed facing the glass sheet immediately below the forming body, and a facing surface of the heat-insulating member is shaped so as to correspond to a sheet thickness variation of the glass sheet, so that a gap between the glass sheet and the heat-insulating member is substantially uniform;

the heat-insulating member has members which are independent of each other and correspond to a center portion and both end portions of the glass sheet;

the heat-insulating member is disposed between the forming body and a cooling roll for cooling an end portion of the glass sheet and suppressing shrinkage thereof in the width direction; and the members of the heat-insulating member are in contact with each other, wherein the gap between the glass sheet and the heat-insulating member is substantially uniform across the width of the glass sheet including both end portions of the glass sheet.

2. The method of manufacturing a glass sheet according to claim 1, characterized in that the facing surface of the heat-insulating member is shaped so as to correspond to the sheet thickness variation of the glass sheet, so that the gap between the glass sheet and the heat-insulating member decreases.

3. The method of manufacturing a glass sheet according to claim 2, characterized in that the sheet thickness of the glass sheet is greater at both end portions thereof than at a center portion thereof.

4. The method of manufacturing a glass sheet according to claim 3, characterized in that the heat-insulating member has members which are independent of each other and correspond to a center portion and both end portions of the glass sheet.

5. The method of manufacturing a glass sheet according to claim 4, characterized in that the members are moveable towards and away from the glass sheet such that a gap between the members corresponding to the center portion of the glass sheet and the glass sheet is substantially the same as a gap between the members corresponding to the end portions of the glass sheet and the glass sheet.

6. The method of manufacturing a glass sheet according to claim 2, characterized in that the heat-insulating member has members which are independent of each other and correspond to a center portion and both end portions of the glass sheet.

7. The method of manufacturing a glass sheet according to claim 6, characterized in that the members are moveable towards and away from the glass sheet such that a gap between the members corresponding to the center portion of the glass sheet and the glass sheet is substantially the same as a gap between the members corresponding to the end portions of the glass sheet and the glass sheet.

8. The method of manufacturing a glass sheet according to claim 1, characterized in that the sheet thickness of the glass sheet is greater at both end portions thereof than at a center portion thereof.

9. The method of manufacturing a glass sheet according to claim 8, characterized in that the heat-insulating member has members which are independent of each other and correspond to a center portion and both end portions of the glass sheet.

10. The method of manufacturing a glass sheet according to claim 9, characterized in that the members are moveable towards and away from the glass sheet such that a gap between the members corresponding to the center portion of the glass sheet and the glass sheet is substantially the same as a gap between the members corresponding to the end portions of the glass sheet and the glass sheet.

11. The method of manufacturing a glass sheet according to claim 1, characterized in that the members are moveable towards and away from the glass sheet such that a gap between the members corresponding to the center portion of the glass sheet and the glass sheet is substantially the same as a gap between the members corresponding to the end portions of the glass sheet and the glass sheet.

12. The method of manufacturing a glass sheet according to claim 1, characterized in that the heat-insulating member is formed of ceramic fibers.

* * * * *